United States Patent [19]
Lane

[11] Patent Number: 6,149,711
[45] Date of Patent: Nov. 21, 2000

[54] METHOD AND APPARATUS FOR SOLAR HEATING AND DISTRIBUTING A MINING LEACH SOLUTION

[76] Inventor: Richard P. Lane, 4226 Whisper La., DePere, Wis. 54115

[21] Appl. No.: 09/271,542

[22] Filed: Mar. 18, 1999

[51] Int. Cl.[7] .............. E21B 43/28; C22B 3/04
[52] U.S. Cl. ............................ 75/712; 266/101
[58] Field of Search ................ 75/712; 266/101

[56] References Cited

U.S. PATENT DOCUMENTS

| | | | |
|---|---|---|---|
| 4,091,070 | 5/1978 | Riggs et al. | 423/41 |
| 4,318,892 | 3/1982 | Von Kohorn | 422/279 |
| 4,348,056 | 9/1982 | Von Kohorn | 299/4 |
| 4,526,615 | 7/1985 | Johnson | 75/101 |
| 4,701,309 | 10/1987 | Ramachandran et al. | 423/20 |
| 4,739,974 | 4/1988 | Herndon | 266/101 |
| 4,960,584 | 10/1990 | Brown | 423/658.5 |
| 5,005,806 | 4/1991 | Krauth | 266/101 |
| 5,030,279 | 7/1991 | Krauth | 75/712 |
| 5,316,567 | 5/1994 | Jones | 75/743 |
| 5,402,991 | 4/1995 | Schindler | 266/101 |
| 5,421,858 | 6/1995 | Smith | 75/746 |
| 5,683,490 | 11/1997 | Earley, III et al. | 75/712 |

*Primary Examiner*—Roy V. King
*Assistant Examiner*—TIma McGuthry-Banks
*Attorney, Agent, or Firm*—Andrus, Sceales, Starke & Sawall

[57] ABSTRACT

A method and apparatus for solar heating a leach solution prior to its distribution over an ore heap. The apparatus includes a distribution mat having a series of individual emitter tubes joined by heat absorbing panels. The heat absorbing panels collect and transfer the absorbed solar energy to the leach solution passing through the emitter tubes. The temperature of the leach solution passing through the emitter tubes is elevated above ambient prior to the leach solution percolating down through the ore heap. The distribution mat formed by the plurality of emitter tubes and heat absorbing panels is formed from a flexible material, thereby allowing the distribution mat to be rolled and unrolled during application to the ore heap.

12 Claims, 2 Drawing Sheets

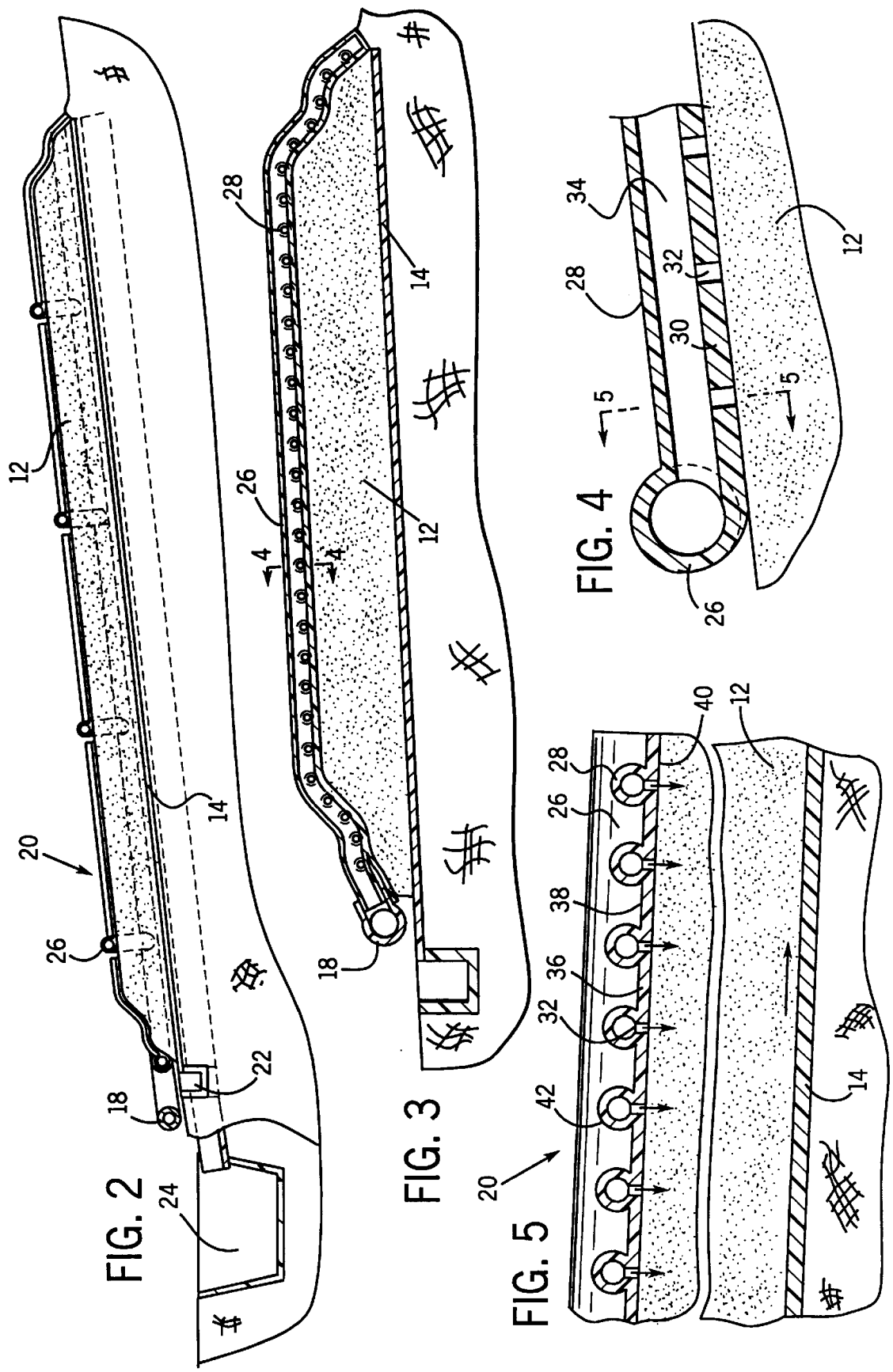

METHOD AND APPARATUS FOR SOLAR HEATING AND DISTRIBUTING A MINING LEACH SOLUTION

BACKGROUND OF THE INVENTION

The present invention relates to heap leach mining. More specifically, the present invention relates to a method and apparatus used in heap leach mining that involves solar heating and distribution of a leach solution prior to its percolation through an ore heap.

Copper is frequently recovered from extremely low grade ores and from mine wastes by a process known as heap leaching. The term "heap" as used in the art means a bed of low grade ore that has been suitably spread over a prepared surface or "pad". A dilute sulfuric acid solution is percolated through the heap and the "pregnant" copper-bearing acid solution is collected after it has percolated through the heap. Typically, the pad on which the heap rests is formed from an impervious material, such as sheets of plastic film (polyethylene), asphalt and/or compacted clay. The heap is often times constructed on an incline such that the copper-bearing leach solution that has percolated through the heap is collected in a reservoir.

The heap of ore is normally piled onto each impervious pad to a depth of 10 to 30 feet after the ore has been pre-crushed to a sufficiently small size to enable the leach solution to reach the metallic-mineral particles contained in the ore. It is a characteristic of heap leach mining that the maximum amount of copper can be recovered from the ore over a long period of time, typically measured in months and years. For example, a typical heap leach operation may reach a maximum copper recovery in a period of two to three years. After the leach solution has passed through the ore heap, the copper-bearing leach solution is subjected to a solvent extraction process in which the copper is transformed from dilute leach solution into a pure and concentrated solution termed advance electrolyte. After the extraction, the advance electrolyte is subjected to an electrowinning process in which the dissolved copper plates out onto permanent stainless steel plates or pure thin copper sheets used as cathodes. The plated copper on each of the stainless steel cathodes can be removed and processed. The copper sheets, when used, grow in weight and can be processed as required.

Conventional percolation systems for heap leach mining normally includes a series of individually spaced emitter tubes extending over the heap of ore. Each of the spaced tubes receives the leach solution and includes a series of openings to permit the leach solution to be distributed for uniform percolation down through the heap. An example of such a system is shown in the Krauth U.S. Pat. No. 5,030,279. In this type of system, each of the individual tubes must be laid out over the ore heap in the desired spaced relationship such that the leach solution adequately permeates through the ore heap. Thus, a great deal of care and time is required to accurately lay out the individual tubes required to adequately distribute the leach solution over the heap.

In heap leach operations, it has been found that metal recoveries are considerably lower in the winter season due to lower temperatures of the ore and the leach solution. Heap leach operations, utilizing both chemical and biological leach solutions, tend to operate most efficiently at temperatures above ambient. While others have proposed heating the leach solution prior to its application to the heap, heating the leach solution has proved to be very inefficient due to the substantial amount of heat lost to atmosphere as the leach solution is distributed through the tubing placed on the heap.

Therefore, it is an object of the present invention to provide a method of increasing the rate at which a semi-precious metal can be extracted from an ore heap. It is a further object of the invention to provide a method that solar heats a leach solution as the leach solution is distributed over the bed of ore. It is an additional object of the invention to provide a method that solar heats the leach solution immediately prior to the leach solution being percolated through the ore heap. Further, it is an object of the invention to provide an apparatus that increases the temperature of the leach solution immediately prior to the leach solution being applied to the ore heap. It is a further object of the invention to provide an apparatus that solar heats the leach solution prior to its percolation through the ore heap. It is an additional object of the invention to provide an apparatus including a series of emitter tubes joined by a heat absorbing panels to form a flexible distribution mat, such that the heat absorbing panels of the distribution mat form a solar collector to heat the leach solution as it is applied to the ore heap. Further, it is an object of the invention to provide an apparatus that can be positioned over the top of an ore heap that joins the individual emitter tubes to provide the required spacing for the tubes.

SUMMARY OF THE INVENTION

The present invention is a method and apparatus for distributing a leach solution over an ore heap for heap leach mining. The apparatus is a distribution mat having a plurality of emitter tubes joined to a main conduit. The main conduit receives a flow of leach solution and distributes the leach solution to each of the emitter tubes. Each of the emitter tubes extends normally from the main conduit and includes a series of spaced pores that allow the leach solution to drip onto and through the ore heap.

Each of the emitter tubes is joined to the emitter tubes positioned adjacent thereto by a heat absorbing panel. Each of the heat absorbing panels includes a generally flat upper and lower surface. When the distribution mat is positioned on the ore heap, the upper surface of each heat absorbing panel is exposed to sunlight and absorbs solar energy. The solar energy absorbed by each heat absorbing panel is transferred by conduction to the leach solution passing through the emitter tubes. The transferred heat elevates the temperature of the leach solution above ambient prior to the leach solution being applied to the ore heap.

In the preferred embodiment of the invention, the heat absorbing panels and the plurality of emitter tubes are integrally formed from a flexible material typically having a dark color, such that both the emitter tubes and heat absorbing panels absorb solar energy that is then transferred to the leach solution. Preferably, the material used to form the distribution mat, including both the heat absorbing panels and the emitter tubes, is sufficiently flexible to allow the distribution mat to be rolled onto a spool when not in use. The spacing between the individual emitter tubes is determined by the specific application for the distribution mats, as is the spacing of the pores within each individual emitter tube. By adjusting the spacing between the emitter tubes and the individual pores contained within each emitter tube, specific flow rates for the leach solution through the ore bed can be achieved.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 2 is a section view taken along line 2—2 of FIG. 1 illustrating multiple solar heating and distributing devices positioned on the heap of ore;

FIG. 3 is a section view taken along line 3—3 of FIG. 1 illustrating a main conduit and a distribution mat of the solar heating and distributing device;

FIG. 4 is an enlarged, partial section view taken along line 4—4 of FIG. 3 illustrating the main conduit and one of the emitter tubes contained in the distribution mat of the present invention; and FIG. 5 is a partial section view taken along line 5—5 of FIG. 4 further illustration the spacing between a plurality of emitter tubes and a plurality of heat absorbing panels positioned between adjacent emitter tubes.

DETAILED DESCRIPTION OF THE INVENTION

Figure 1:
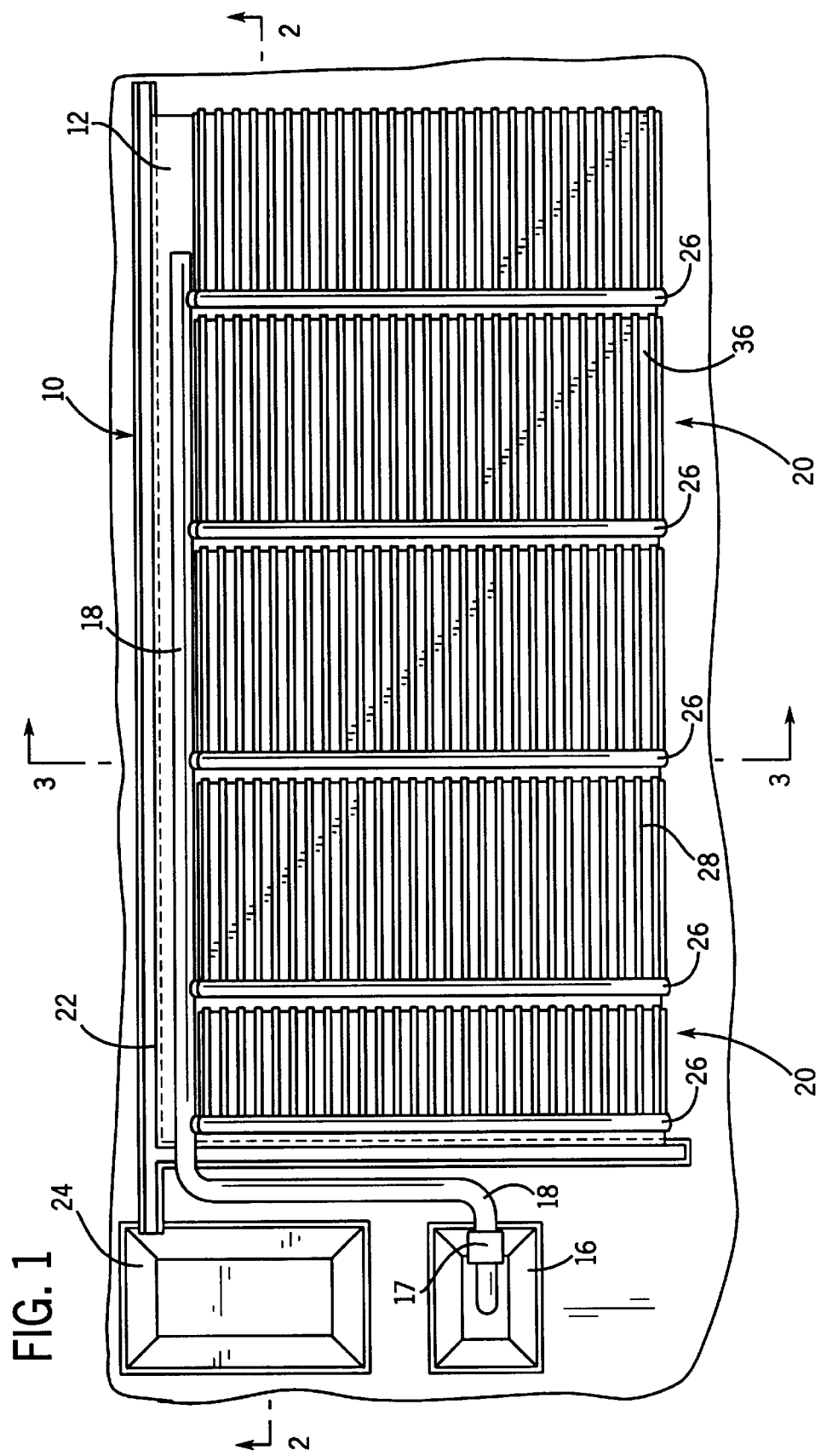
FIG. 1 is a top plan view of a heap leach mine utilizing a solar heating and distributing device of the present invention to apply a mining leach solution over a heap of ore.

FIGS. 1 and 2 illustrate a heap leach mining system 10 of the present invention as positioned on a bed or "heap" 12 of low grade ore. The heap of ore 12 is comprised of pre-crushed ore of a sufficiently small size that has a typical depth of between 10 and 30 feet. The ore contained in the heap 12 typically contains small concentrations of a metal to be collected, such as low grade gold, silver or copper. In the embodiment of the invention to be described, the ore includes trace amounts of copper, although the invention is equally applicable to ores containing other metals. The ore heap 12 is deposited on a pad 14 formed from an impervious material, such as sheets of plastic film, asphalt, and/or compacted clay. The pad 14 prevents a leach solution from entering into the ground and being absorbed, thereby reducing contamination of the ground.

A supply of leach solution used to remove the desired material from the heap of ore 12 is drawn from a reservoir 16 by a pump 17 and a supply pipe 18. The supply pipe 18 runs along the bottom edge of the heap 12 and is connected to a plurality of distribution mats 20 constructed in accordance with the present invention. Since the ore heap 12 typically extends for hundreds of feet, numerous distribution mats 20 are utilized to adequately cover the top surface area of the heap 12. The distribution mats 20 allow the leach solution to percolate down through the ore heap 12 and be collected on the impervious pad 14.

As can be seen in FIG. 2, the ore heap 12 is constructed on an incline, such that the leach solution percolated down through the ore heap 12 is directed by gravity to the lower edge of the pad 14, where the metal-bearing leach solution is collected in a collection trough 22. The collection trough 22, in turn, feeds the pregnant leach solution to a collection reservoir 24. The supply of pregnant leach solution from the collection reservoir 24 is then subject to a solvent extraction and electro-winning process in which the metallic material suspended in the pregnant leach solution is extracted from the pregnant leach solution in a conventional manner.

Referring back to FIG. 1, each of the distribution mats 20 generally includes a main conduit 26 extending along a longitudinal axis and a plurality of emitter tubes 28 extending outward from the main conduit 26. In the preferred embodiment of the invention, the longitudinal axis of each emitter tube 28 is perpendicular to the longitudinal axis of the main conduit 26. The main conduit 26 of each distribution mat 20 is in fluid communication with the supply pipe 18 such that leach solution being pumped through the supply pipe 18 flows into the main conduit 26 of each distribution mat 20. In a contemplated embodiment of the invention, the length of the main conduit 26 is approximately 50 feet while the length of each emitter tube 28, and thus the distribution mat 20, is approximately 200 feet, although other lengths are contemplated depending on the specific heap 12 being mined.

Referring now FIGS. 3 and 4, the main conduit 26 of each distribution mat 20 is in fluid communication with each of the plurality of emitter tubes 28, such that the leach solution flowing through the main conduit 26 flows through each of the plurality of emitter tubes 28. In the preferred embodiment of the invention, each of the emitter tubes 28 is integrally formed with the main conduit 26 such that no fittings or external connections are required between the main conduit 26 and the emitter tubes 28. In the preferred embodiment of the invention, both the emitter tubes 28 and the main conduit 26 are formed from a relatively flexible polyethylene material, such as is commercially available from Dupont.

Turning now to FIGS. 4 and 5, each of the emitter tubes 28 includes a bottom portion 30 of the tube wall that includes a series of spaced pores 32. The pores 32 allow the leach solution to pass from open interior 34 of each emitter tube 28 and onto the top surface the ore heap 12. Once the leach solution leaves the emitter tubes 28, gravity causes the leach solution to percolate down through the ore heap 12, such that the leach solution can extract the desired metallic material from the ore heap.

Referring now to FIG. 5, each of the emitter tubes 28 is joined to the emitter tube or tubes 28 positioned adjacent thereto by a heat absorbing panel 36. Preferably, the heat absorbing panels 36 are formed from the same material used to form the emitter tubes 28. Each absorbing panel 36 is dark in color such that the heat absorbing panels 36 act as solar collectors that absorbs solar energy and generates heat. Each of the heat absorbing panels 36 is approximately % inches thick and includes an upper surface 38 that is exposed to sunlight and a lower surface 40 that contacts the top surface of ore heap 12. As can be seen in FIG. 5, the lower surface 40 of each heat absorbing panel 36 is generally continuous with the lower surface 40 of the adjacent heat absorbing panel 36, such that the plurality of lower surfaces 40 form a generally planar surface for the distribution mat 20.

As shown in FIG. 1, the series of emitter tubes 28 included in each of the distribution mats 20 is generally aligned with respect to the adjacent tubes to form generally parallel lines. The emitter tubes 28 are separated from each other by a predetermined constant distance. The distance between adjacent emitter tubes 28 is one of the factors that determines the distribution rate of the leach solution, since more closely spaced emitter tube 28 would clearly increases the amount of leach solution distributed by each distribution mat 20. The distance between the emitter tubes 28 is generally in the range of approximately 1.0 feet to 12.0 feet depending upon the type of heap leach mining being done. The distance between adjacent emitter tubes 28 defines the width of each heat absorbing panel 36 contained between the adjacent emitter tubes 28.

As previously discussed, in the preferred embodiment of the invention the emitter tubes 28, the heat absorbing panels 36 and the main conduit 26 are all formed from the same material and are joined to form the integrally constructed distribution mat 20. Preferably, the material used to construct the distribution mat 20 is sufficiently flexible such that during installation of the distribution mat 20 on the ore heap 12, the main conduit 26 is first extended width-wise across the ore heap 12 and joined to the supply pipe 18. Once connected, the joined emitter tubes 28 and heat absorbing panels 36 are unrolled to cover a portion of the ore heap 12 as shown in FIG. 1. Since the parallel emitter tubes 28 are joined by the heat absorbing panels 36, the heat absorbing panels 36 provide the required spacing between adjacent emitter tubes 28.

As can be seen in FIG. 5, the heat absorbing panels 36 are preferably tangentially joined to the bottom-most portion 30 of the outer circumference of adjacent emitter tubes 28. In this manner, almost the entire outer circumference 42 of each emitter tube 28 is exposed to sun light, such that both the heat absorbing panel 36 and the emitter tubes 28 act as solar collectors.

The method of heap leach mining utilizing the distribution mats 20 discussed above will now be described in greater detail. Initially, a supply of leach solution is pumped from the reservoir 16 by the conventional pump 17. The leach solution contained in the reservoir 16 is at ambient temperature, since the reservoir 16 is generally exposed to the environment. As previously discussed, the leach solution extracts a larger percentage of metal from the low grade ore in the heap 12 when the leach solution is at an elevated temperature above ambient. In some prior art systems, it was suggested to heat the leach solution within the reservoir 16 before it is pumped through the supply pipe 18 and distributed onto the ore heap 12. However, due to the relatively long travel time and the overall length of piping that the leach solution is contained within before it is actually distributed over the ore heap 12, a large amount of the heat applied to the leach solution while in the reservoir 16 is lost to the environment before the leach solution actually contacts the ore heap 12. Thus, any advantage gained in the amount of metal recovered was lost in the cost of heating the leach solution.

After flowing through the supply pipe 18, the supply of leach solution enters into one of the main conduits 26 for the plurality of distribution mats 20 positioned on the top surface of the ore heap 12. The leach solution flowing in each of the main conduits 26 flows out of the main conduit 26 and into the plurality of individual emitter tubes 28 joined to the main conduit 26. The rate at which the leach solution is distributed to the emitter tubes 28 depends on a number of predetermined factors, such as the type of leach solution, the size of the emitter tubes and the spacing of the emitter tubes relative to each other. Additionally, the required time of contact of the leach solution with the ore bed 12 will largely be determined by the degree of pulverization of the ore, the strength of the leaching solution, the degree of solubility of the metal or the form in which it occurs, and the effectiveness of the contact. However, as previously discussed, the effectiveness of the leach solution is increased by elevating the temperature of the leach solution relative to ambient.

As the leach solution flows into each of the emitter tubes 28, the leach solution absorbs the solar heat collected by both the emitter tubes 28 and the heat absorbing panels 36 positioned between adjacent emitter tubes 28. Since both the emitter tubes 28 and the heat absorbing panels 36 are formed from a dark, heat absorbing material, a sufficient amount of heat is absorbed by the emitter tubes 28 and panels 36. The heat absorbed by these two components is transferred to the leach solution passing through the open interior 34 of each emitter tube 28. In the preferred embodiment of the invention, the temperature of the leach solution can be elevated by approximately 5–8° F. above ambient during periods of full sun prior to the leach solution being applied to the ore heap 12. An increase in temperature of 1° F. allows up to 1% more metal to be recovered from the ore heap 12.

After the leach solution has passed through the ore heap 12 and removes the desired metal material, the pregnant leach solution is collected on the impervious pad 14 and flows downward into the collection trough 22. Once in the collection trough 22, the copper-bearing leach solution flows into the collection reservoir 24. The pregnant leach solution in the reservoir 24 is then processed to remove the suspended copper from the leach solution in a conventional manner.

In addition to elevating the temperature of the leach solution before it is applied to the ore heap 12, each of the distribution mats 20 also allows the heap leaching system 10 be initially laid out in less time with less effort. In prior heap leach mining, such as shown in U.S. Pat. No. 5,030,279, each of the individual emitter tubes must be separately laid out in a parallel configuration on top of the ore heap. Since each of the emitter tubes are typically hundreds of feet long, the process of laying out the numerous emitter tubes with the required spacing between each adjacent tube takes a large amount of manpower and time.

By utilizing the distribution mats 20 of the present invention, each of the distribution mats 20 can be quickly and simply rolled out from a large spool onto the top surface of the ore heap 12. Since the spacing between each of the adjacent emitter tubes 28 is fixed by the heat absorbing panel 36 connected therebetween, time is not wasted ensuring the proper spacing between adjacent emitter tubes. Thus, the combination of the heat absorbing panels 36 and the plurality of emitter tubes 28 forms a generally one-piece structure that can be rolled out either manually or by machine without having to worry about the proper spacing between adjacent emitter tubes 28. In the preferred embodiment of the invention, each of the distribution mats 20 is formed from a flexible "rubber" like material that can be rolled into large spools and transported after the ore heap 12 has been completely mined.

Although the present invention has been shown and described as included heat absorbing panels 36 attached tangentially to each of a pair of adjacent emitter tubes 28, it is contemplated by the inventor that the heat absorbing panels 36 could be connected at any point along each of the emitter tubes 28 while operating within the scope of the invention. For example, the heat absorbing panel 36 could be connected at the equator of each emitter tube 28 such that a portion of each emitter tube 28 would extend both above and below the flat surfaces of the heat absorbing panels 36. However, the embodiment shown in FIG. 5 is contemplated as being most preferred, since the largest amount of surface area of both the emitter tubes 28 and the heat absorbing panels 36 are exposed to direct sunlight.

Various alternatives and embodiments are contemplated as being within the scope of the following claims particularly pointing out and distinctly claiming the subject matter regarded as the invention.

I claim:

1. A device for applying a leach solution to an accumulated heap of ore, the leach solution being applied to remove a metallic material from the ore, the device comprising:

a heat-absorbing distribution mat sized to cover at least a portion of the heap and positionable in contact with the top surface of the heap, the distribution mat including a plurality of parallel spaced emitter tubes, each emitter tube having a plurality of spaced pores; and a main conduit integrally formed with the distribution mat, the main conduit being in fluid communication with the plurality of emitter tubes formed in the distribution mat, such that the main conduit receives the supply of leach solution and communicates the leach solution to the emitter tubes formed in the distribution mat, wherein heat is transferred from the distribution mat to heat the leach solution such that the heated leach solution passes through the pores in each emitter tube and is applied to the heap.

2. A device for applying a leach solution to an accumulated heap of ore, the leach solution being applied to remove a metallic material from the ore, the device comprising:

a heat-absorbing distribution mat sized to cover at least a portion of the heap and positionable in contact with the top surface of the heap, the distribution mat including a plurality of parallel spaced emitter tubes, each emitter tube having a plurality of spaced pores, wherein each of the emitter tubes in the distribution mat is joined to the adjacent emitter tubes by a heat-absorbing panel; and a main conduit attached to the distribution mat, the main conduit being in fluid communication with the plurality of emitter tubes formed in the distribution mat, such that the main conduit receives the supply of leach solution and communicates the leach solution to the emitter tubes formed in the distribution mat, wherein heat is transferred from the distribution mat to heat the leach solution such that the heated leach solution passes through the pores in each emitter tube and is applied to the heap.

3. The device of claim 2 wherein each heat-absorbing panel is tangentially joined to two adjacent emitter tubes.

4. A method of heap leach mining to remove a metallic material from a heap of ore accumulated upon an impervious pad comprising the steps of:

supplying and conducting a leach solution adjacent to the ore heap;

communicating the leach solution to a plurality of emitter tubes positioned in a parallel spaced relationship relative to each other and positioned upon the ore heap;

attaching a heat-absorbing panel to each emitter tube, such that solar energy is absorbed by the heat-absorbing panel and transferred from the heat-absorbing panel to solar heat the leach solution while the leach solution is contained in the emitter tube such that the temperature of the leach solution is elevated above an ambient temperature;

emitting the heated leach solution from the spaced emitter tubes onto the ore heap such that the leach solution percolates through the ore heap; and collecting the leach solution from the impervious pad after the leach solution has percolated through the ore heap.

5. The method of claim 4 wherein each heat-absorbing panel extends between and is joined to two adjacent emitter tubes, such that the combination of the emitter tubes and heat-absorbing panels form a continuous distribution mat.

6. The method of claim 4 further comprising the step of connecting the plurality of emitter tubes to a main conduit, the emitter tubes being in fluid communication with the main conduit such that the supply of leach solution passes through the main conduit and into the plurality of emitter tubes for distribution over the ore heap.

7. A method for extracting a metallic material from ore, the method comprising the steps of:

accumulating a heap of ore on an impervious pad;

positioning at least one main conduit on the ore heap, the main conduit being in fluid communication with a supply of leach solution;

distributing the leach solution from the main conduit to a plurality of emitter tubes in fluid communication with the main conduit, each of the emitter tubes having a plurality of spaced pores, the plurality of emitter tubes being positioned in a laterally spaced parallel relationship relative to each other;

attaching a solar collector to each emitter tube to absorb energy;

transferring the solar energy from the solar collector to the leach solution to heat the leach solution to an elevated temperature above ambient while the leach solution is within the emitter tube;

emitting the solar-heated leach solution through the pores contained in each of the emitter tubes such that the leach solution percolates through the heap of ore;

collecting the leach solution from the impervious pad after the leach solution has percolated through the ore heap; and recovering the metal contained in the leach solution after the leach solution has percolated through the ore heap.

8. The method of claim 7, wherein the step of solar heating the leach solution includes positioning the solar collector between adjacent emitter tubes, the solar collector being attached to each of the adjacent emitter tubes such that the combination of the emitter tubes and solar collectors form a continuous distribution mat.

9. The method of claim 8 wherein each solar collector is a heat-absorbing panel tangentially joined to each of the adjacent emitter tubes.

10. The method of claim 8 wherein the distribution mat is formed from a flexible polyethylene.

11. The method of claim 10 further comprising the step of positioning the distribution mat on the ore heap such that the solar collector positioned between the adjacent emitter tubes provide the spacing between the emitter tubes.

12. The method of claim 11 wherein the step of positioning the distribution mat includes rolling the distribution mat onto the ore heap from a spool.

* * * * *